April 7, 1953   J. J. ROBINSON, JR., ET AL   2,633,809
TRANSFER MECHANISM FOR AUTOMOBILE PARKING GARAGES
Filed Aug. 3, 1950   3 Sheets-Sheet 1

Inventors
Joseph J. Robinson, Jr. and
Howard M. Wassem

Attorneys

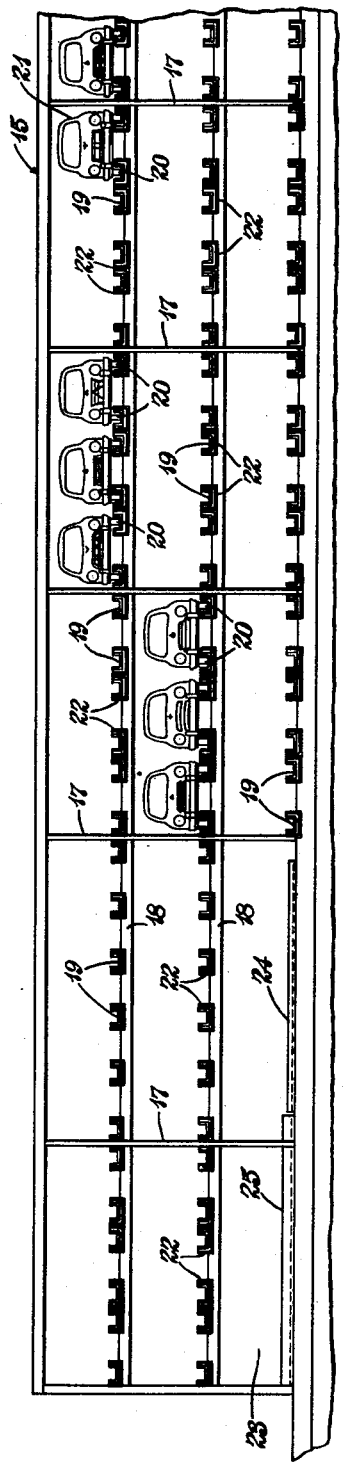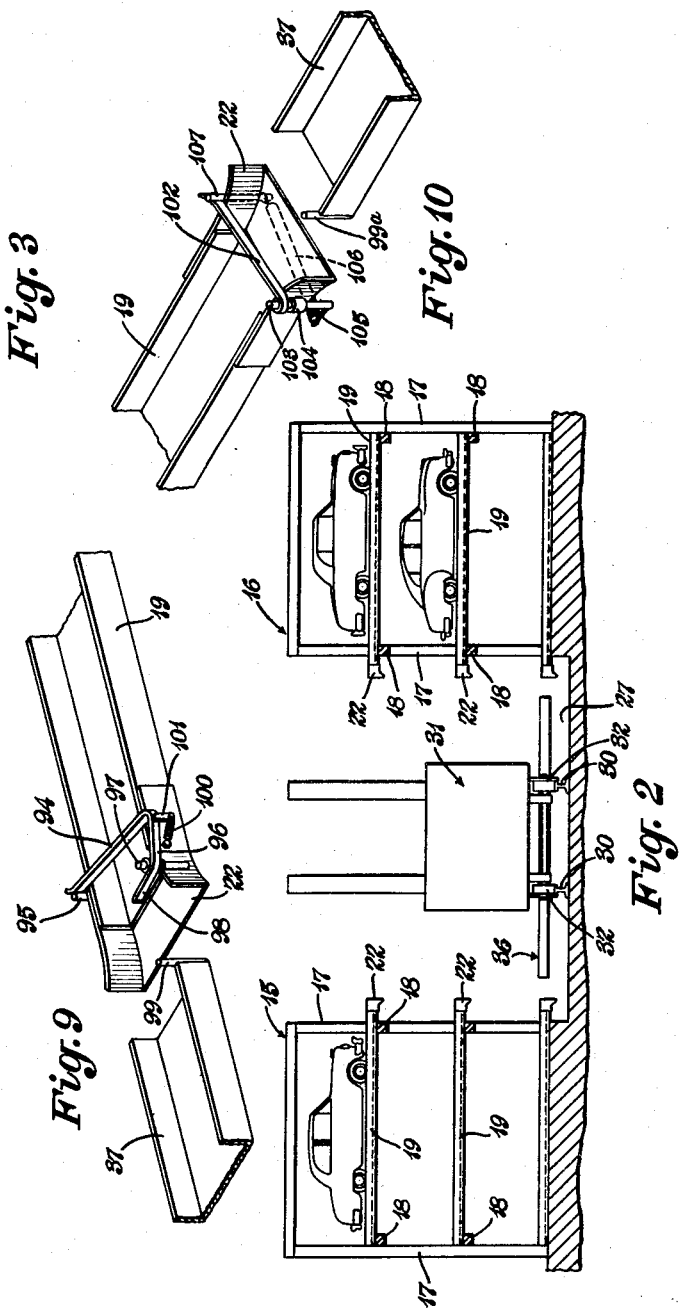
Inventors
Joseph J. Robinson, Jr.
Howard M. Wassem

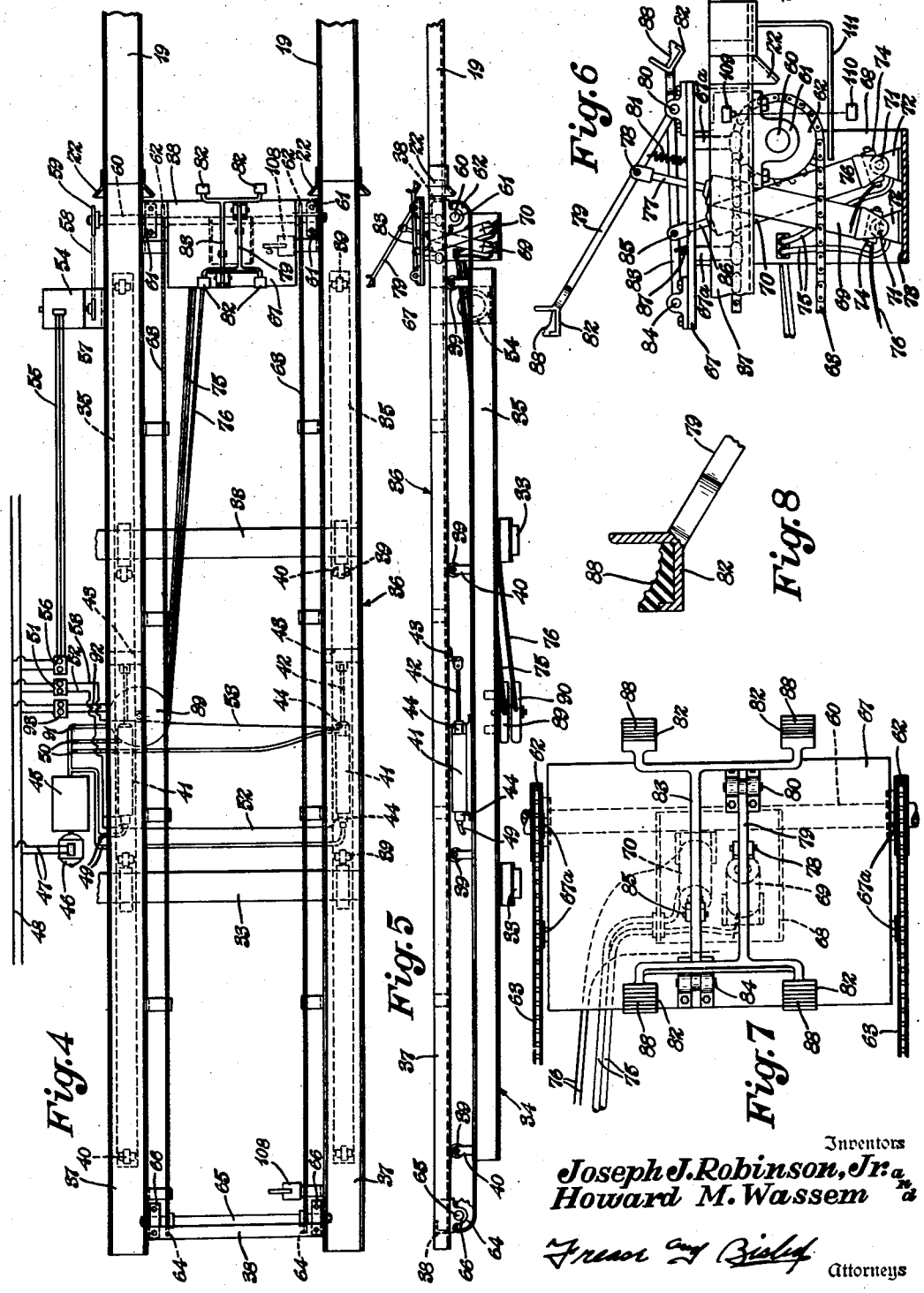

Patented Apr. 7, 1953

2,633,809

UNITED STATES PATENT OFFICE 2,633,809

TRANSFER MECHANISM FOR AUTOMOBILE PARKING GARAGES

Joseph J. Robinson, Jr., Dover, and Howard M. Wassem, New Philadelphia, Ohio

Application August 3, 1950, Serial No. 177,394

8 Claims. (Cl. 104—48)

The invention relates to the type of automobile parking or storage structures or lots comprising two spaced, parallel, multistory wings, each story being divided into bins or stalls to contain automobiles; turntables being provided if desirable for incoming and outgoing cars, and transfer and lifting mechanism being provided for receiving a car from the incoming turntable and moving it longitudinally between the spaced multi-story wings and raising it to any desired level and transferring the car to the desired storage bin or stall; and for removing the car from a storage bin or stall, lowering it to the ground level, if necessary, and moving it to a position where it is transferred to the outgoing turntable, in cases where such turntable is provided.

Automobile storage structures of this general character have been designed in the past, but owing to the extremely complex and expensive transfer and lifting mechanism such devices have not been satisfactory or commercially practical.

The present invention contemplates a simple and efficient transfer and lifting mechanism, for transferring an automobile from the incoming turntable to a storage bin or stall, and for removing the automobile from the storage bin or stall and transferring it to the outgoing turntable.

Another object is to provide a device of the character referred to in which the transfer and lifting mechanism is in the form of a lift truck, travelling longitudinally on rails between the two wings of multi-story bins or stalls.

A further object is to provide such a transfer and lifting mechanism in which a vertically movable and laterally shiftable platform is carried by the lift truck for receiving automobiles from a turntable and transferring them to a storage bin or stall, or vice versa.

A still further object is to provide endless chain driven, and fluid cylinder operated, transfer arms upon the platform for engagement with the bumpers of an automobile for pulling it from a turntable or storage bin onto the transfer and lift platform, and for pushing the automobile from the transfer platform into a storage bin or onto a turntable.

Another object is to provide means for guiding an automobile onto the incoming turntable.

A further object is to provide means for guiding channel rails of the transfer platform into positive contact with channel rails in the storage bins and upon the turntables.

A still further object is to provide fluid operated means for laterally shifting the transfer platform.

Another object of the invention is to provide positive stopping means for retaining an automobile in a storage bin.

The above and other objects, apparent from the drawings and following description, may be attained, the above described difficulties overcome and the advantages and results obtained, by the apparatus, construction, arrangement, and combinations, subcombinations and parts, which comprise the present invention, a preferred embodiment of which, illustrative of the best mode in which applicants have contemplated applying the principle, being set forth in detail in the following description and illustrated in the accompanying drawings, in which:

Fig. 2 is a transverse, sectional view through the same;

Figure 1:
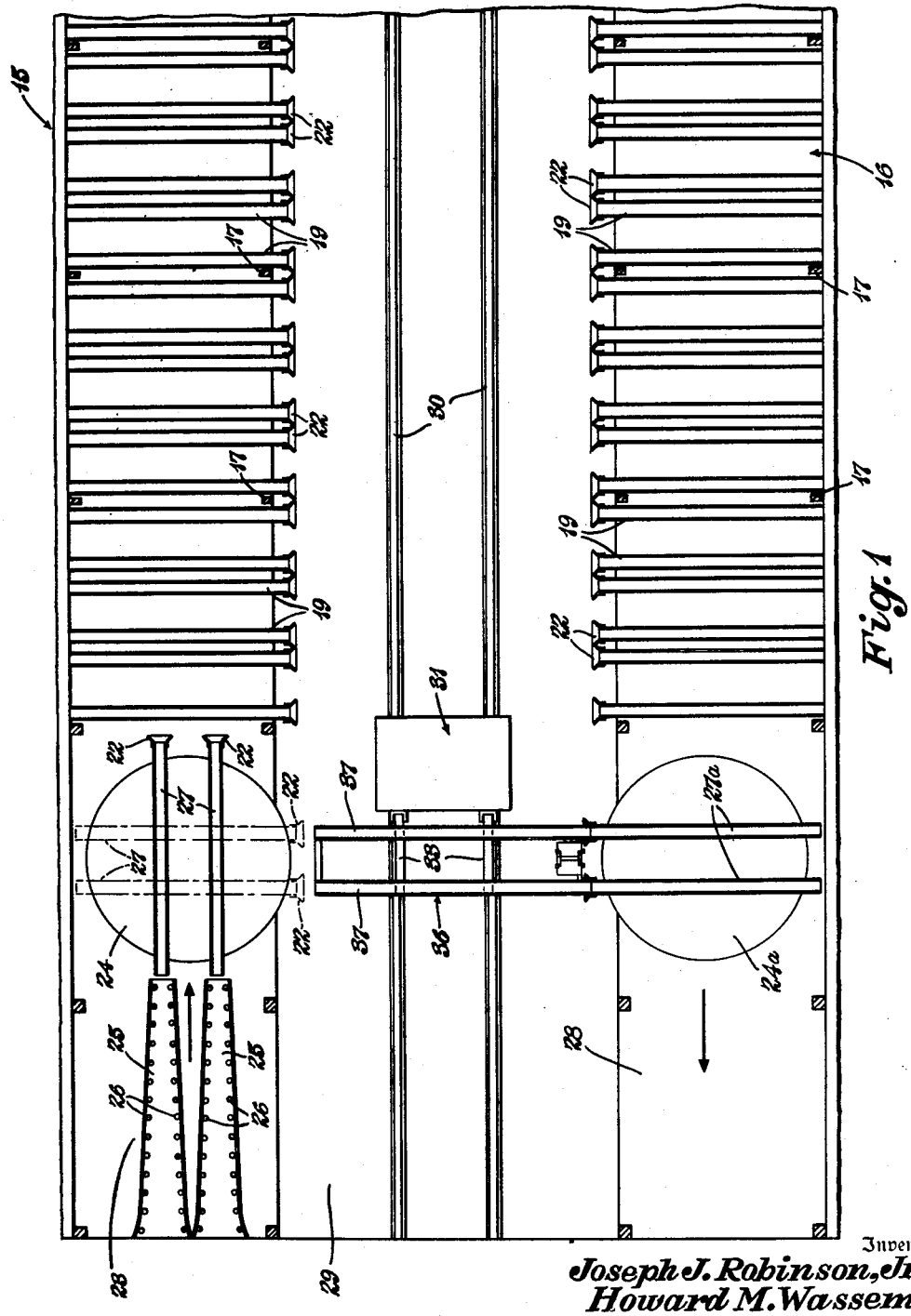
Figure 1 is a plan, sectional view of an automobile parking or storage structure, provided with the improved transfer mechanism.

Fig. 3 a front elevation of one of the multistory parking or storage wings;

Fig. 4 an enlarged, top plan view of the improved transfer platform;

Fig. 5 a side elevation of the transfer platform;

Fig. 6 an enlarged side elevation of the transfer arms upon the platform;

Fig. 7 a top plan view of the transfer arms;

Fig. 8 an enlarged, fragmentary, sectional elevation of the gripping head of one of the transfer arms;

Fig. 9 a detached, perspective view of the automatically operated stop device for retaining the cars in the storage bins; and Fig. 10 a similar view of a modification of the stop device.

The parking structure includes two spaced parallel, multi-story wings, indicated generally at 15 and 16. Each wing comprises vertical structural members 17 and horizontal structural members 18 connected thereto at different levels for supporting the transversely disposed channel rails 19 for receiving the wheels 20 of automobiles or similar vehicles 21.

The channel rails 19 are arranged in pairs, properly spaced to receive the wheels of an automobile so that each pair of these channel rails forms a parking or storage bin or stall for receiving an automobile or similar vehicle. An outwardly and downwardly flared guide member 22 is provided at the inner end of each channel rail 19 for a purpose to be later described.

Any desired number of bins or stalls may be provided in each wing, three stores being shown in the drawings for the purpose of illustration. The ground floor of each wing is also provided with channel rails 19, dividing the same into a plurality of parking or storage bins, excepting at one end where entrance and exit passages are provided.

An entrance passage 23 is shown in one end of the wing 15, leading to the entrance turntable 24. This entrance passage may include a pair of inwardly tapered troughs 25, having rollers 26 along each side, to guide an incoming car onto the channel rails 27 of the entrance turntable 24.

Each of the channel rails 27 may have a guide member 22 at one end thereof, similar to the guide members 22 upon the channel rails 19 of the storage bins.

An exit passage 28 is shown in one end of the ground floor of the wing 16 and includes the exit turntable 24a having the channel rails 27a. The construction of each of these turntables may be the same.

A longitudinal corridor 29 is provided between the two parallel wings 15 and 16, and has the track rails 30 longitudinally located therethrough on the ground level, upon which rails is mounted a lift truck, indicated generally at 31, being provided with flanged traction wheels 32, riding upon the rails 30, whereby the lift truck may travel longitudinally the length of the corridor 29, between the wings 15 and 16.

This lift truck is provided with the usual forks 33, with conventional lift-truck mechanism for raising and lowering said forks such as shown in Riemenschneider Patent No. 2,445,038 dated July 13, 1948, and is preferably so constructed that the forks may be stopped at the various floor levels of the wings 15 and 16.

A laterally disposed transfer and lift platform, indicated generally at 34, is carried by the forks 33 of the lift truck and comprises the spaced frame members 35, rigidly connected to the forks 33 and having the laterally shiftable transfer platform, generally indicated at 36, mounted thereon.

This shiftable platform comprises the spaced, parallel channels 37 rigidly connected together as by the cross members 38. This platform is mounted upon rollers 39, journalled in bearings 40 carried by the frame members 35 and is adapted to be laterally shifted in either direction by means of the fluid cylinders 41, mounted upon the frame members 35, the piston rods 42 thereof being connected as at 43 to the shiftable channel rails 37.

These fluid cylinders may be of a conventional type, provided with solenoid valves 44 at opposite ends. The cylinders 41 may be operated by air or other fluid if desired. For the purpose of illustration, an air compressor 45 is diagrammatically shown in Fig. 4, driven by a motor 46 which is connected by wires 47 to a power line 48.

Hose lines 49 lead from the air compressor to the solenoid valves 44 at one end of each cylinder and similar hose lines 50 lead from the air compressor to the solenoid valves 44 at the opposite ends of the cylinder.

An electric control switch 51 is connected to the power line 48 and connected through wires 52 and 53 with the solenoid valves 44 at opposite ends of the cylinders 41.

A motor reducer 54 is connected by wires 55 with an electric control switch 56, which is connected to the power line 48. A sprocket wheel 57 upon the motor reducer is connected by the sprocket chain 58 with a sprocket wheel 59 upon the drive shaft 60 journalled in bearings 61 connected to the shiftable channels 37.

Sprocket wheels 62 are fixed upon the shaft 60, and are connected by the endless chains 63 with sprocket wheels 64 mounted upon the driven shaft 65, journalled in bearings 66 connected to the opposite end portions of the channels 37.

A table 67 is connected to the chains 63, as indicated at 67a, and has suspended therefrom a bracket 68 upon which is carried a pair of fluid cylinders 69 and 70, the lower ends of which are pivotally connected, as at 71, to bearings 72 mounted upon the bottom wall 73 of the bracket 68.

Each of the cylinders 69 and 70 is provided at its lower end with a solenoid valve 74, to which are connected air lines 75 and electric wires 76.

The piston rod 77, of the cylinder 69, is pivotally connected, as at 78, to a lever arm 79, fulcrumed as at 80 upon one side of the table 67. A spring 81 may be connected to the lever arm 79 and the table 67, for normally returning the lever arm 79 to folded position against the top of the table.

A pair of heads 82 is provided upon the free end of the lever arm 79 for engagement with the bumper of an automobile as will be later described.

A lever arm 83, similar to the arm 79, but oppositely disposed therefrom, is fulcrumed as at 84 upon the table and connected as at 85 to the piston rod 86 of the cylinder 70, and is provided at its free end with a pair of heads 82, for engagement with the bumpers of an automobile in the same manner as the heads 82 upon the lever arms 79.

A spring 87 may be provided for returning the lever arm 83 to folded condition against the top of the table 67. If desired, instead of providing the springs 81 or 87 for returning the lever arms 79 and 83 to normal position, the cylinders 69 and 70 may be provided with solenoid valves at opposite ends, in the same manner as shown and described with reference to the cylinders 41, and fluid lines and electric connnections may be made thereto.

For the purpose of providing frictional engagement with the bumpers of the automobiles, the heads 82 may be provided with corrugated, concaved rubber contact surfaces 88, as best shown in Fig. 8.

The fluid lines 75, and electric wires 76, may lead to reels 89 and 90 respectively, journalled upon the underside of one of the channels 37. The reel 89 is connected by fluid line 91 to the compressor 45 and the reel 90 is connected by by electric wires 92 to the electric control switch 93, which is connected to the power lines 48.

These reels are provided to retrieve the fluid lines 75 and electric wires 76 as the table 67 is moved longitudinally along the lift and transfer platform by the chains 63, as will be later described.

For the purpose of retaining the vehicles within the parking or storage bins, an automatically operated stop mechanism may be provided in the end of each channel rail 19, as shown in Fig. 9. This stop arrangement comprises a lever arm 94, adapted to normally extend across the top of each channel 19, near its end, a stop lug 95 being provided upon one side of the channel for limiting the movement of the arm 94 in one direction.

The arm 94 is provided with a substantially U- shape portion 96 at its other end, fulcrumed to that side of the channel 19, as at 97, and having the extension 98 located in the path of the stud 99 upon the adjacent end of each channel rail 37 of the shiftable transfer and lift platform.

A spring 100 is connected to a depending lug 101 upon the U-shape portion 96 and to the adjacent side of the channel 19 for normally holding the stop arm 94 in the position shown in Fig. 9.

In Fig. 10 is shown a modification of this stop arrangement, in which the arm 102 is fixed upon a shaft 103, journalled as at 104 on one side of the channel rail 19 and provided at its lower end with a radial arm 105, to which is connected a spring 106, the opposite end of which may be connected to the lower end of the stop pin 107 on the other side of the channel. A stud 99a is provided upon the laterally shiftable channel 37 of the transfer and lift platform for operating this stop device.

In the operation of the apparatus, when an automobile enters the entrance passage 23 it is driven into the roller guide troughs 25, in the direction of the arrow shown in Fig. 1, which guide the wheels of the automobile onto the channel rails 27 of the entrance turntable 24, if a turntable is used at this point. Otherwise the vehicle may be driven directly onto the lift truck. With the automobile thus entirely supported upon the channel rails 27, the turntable 24 is turned 90 degrees in a clockwise direction.

The lift truck 31, with the channel rails 37 in normal position and located at ground level, is then moved along the track rails 30 to a position where the channel rails 37 thereof are aligned with the channel rails 27 of the turntable 24.

The shift cylinders 41 are then operated in the proper direction to shift the channel rails 37 toward the turntable 24, to a point where the ends of the channel rails 37 are received in the flared guides 22 at the adjacent ends of the channel rails 27 of the turntable.

With the lever arms 79 and 83 both in lowered position, the reversing motor reducer 54 is then operated in a direction to move the chains 63, and with them the table 67, to the ends of the transfer platform adjacent to the turntable 24.

When the table 67 is properly positioned the motor reducer is stopped as by the limit switch 108 at the adjacent end of the platform, operated in conventional manner by the table 67 and the cylinder 69 is operated to raise the lever arm 79 to the position shown in Fig. 6, so that the concaved, serrated rubber surfaces of the heads 82, upon the arm 79, will engage under the front bumper of the automobile sitting upon the turntable 24.

The reversing motor reducer 54 is then operated in the opposite direction, to move the chains 63 and the table 67 carried thereby to the opposite end of the transfer platform, pulling the automobile, through the lever arm 79 and the front bumper of the automobile, directly onto the channel rails 37.

The shift cylinders 41 are then operated in the opposite direction, to return the channel rails 37 to normal position. Referring to Fig. 2, it will be seen that when the channel rails 37 are in the normal position there is a considerable clearance between the ends of these rails and the adjacent ends of the channel rails 19 in the wings 15 and 16, so that the lift truck may be freely moved longitudinally through the corridor 29, upon the track rails 30, and the transfer and lift platform 34 thereof may be freely moved vertically at any point within the structure.

The lift truck 31 is then moved along the track rails 30, and/or the transfer and lift platform 34 is raised, so that the channel rails 37 thereof will be aligned with the channel rails 19 of the bin or stall into which it is desired to place the automobile.

If it is desired to park the car in a bin in the wing 15, the shift cylinders 41 are then operated to move the channel rails 37 of the platform in that direction, so that the ends thereof enter the flared guides 22 upon the channel rails 19 of that particular bin, in the manner shown in Figs. 4, 5 and 6.

For this purpose, devices shown in Figs. 9 and 10 are provided in the bins for preventing the cars from accidentally rolling out of the channel rails 19, it will be seen that this movement of the channel rails 37 will throw the proper arm 94 or 102, as the case may be, into open position.

Assuming that the car is to be parked in a bin in the wing 15, the lever arm 79 may remain in raised position, with the heads 82 thereof in engagement with the front bumper of the automobile. The motor reducer 54 is then operated in a direction to move the chains 63, and with them the table 67, toward the wing 15, pushing the automobile off of the channel rails 37 of the lift and transfer platform and onto the channel rails 19 of the desired bin.

When the car is entirely parked within the bin, the lever arm 79 is lowered away from the bumper of the car, and the shift cylinders 41 are again operated to move the channel rails 37 back to normal position, and as the studs 99 or 99a, upon the channel rails 37, are withdrawn from contact with the spring loaded stop arms 94 or 102, permitting them to be returned to normal positions, as shown in Figs. 9 and 10, they provide a stop to prevent the automobile from rolling out of the bin in which it is parked.

If the car is to be parked in a bin in the wing 16, after the lift truck has been operated to move the transfer and lift platform into position adjacent to the desired bin, the shift cylinders 41 are operated in the proper direction to move the channel rails 37 of the platform, toward the wing 16, so that the ends thereof are received in the flared guides 22 of the channel rails 19 of the proper bin, as shown in Figs. 4, 5 and 6.

The cylinder 69 is then operated to lower the lever arm 79 out of engagement with the front bumper of the automobile, and with both lever arms 79 and 83 in lowered position, the motor reducer 54 is operated in a direction to move the table 67 to the opposite end of the transfer platform.

The lever arm 83 is then raised by operation of the cylinder 70, so that the heads 82 thereof engage the rear bumper of the automobile, and the motor reducer 54 is operated in the opposite direction, moving the table 67 toward the wing 16 and pushing the automobile off of the channel rails 37 of the platform and onto the channel rails 19 of the desired bin, and movement of the table 67 is again stopped by the adjacent limit switch.

To remove a vehicle from a parking bin, the lift truck is moved upon the track rails to the desired point and the platform thereof raised, if necessary, to the desired level, and operated as above described to laterally move the channel rails 37 thereof into engagement with the channel rails 19 of the desired bin, this being accomplished through operation of the cylinders 41 in the manner above described.

Either of the lever arms 79 or 83 may then be raised by operation of the cylinder 69 or 70, to engage the front or rear bumper of the automobile, as the case may be, and the table 67 is operated, through the motor reducer 54, to pull the automobile onto the channel rails 37 of the transfer platform.

The shift cylinders 41 are again operated to move the channel rails 37 to normal position, and the platform is lowered to the ground level, if necessary, and then moved to the position shown in Fig. 1 and operated to engage the channel rails 37 thereof with the channel rails 37a of the outgoing turntable 24a.

Either lift arm 79 or 83, as may be required, is then raised into engagement with the bumper of the automobile which is located at the end opposite to the turntable 24a, and the motor reducer 54 is operated to move the table 67 toward the turntable 24a, pushing the car onto the outgoing turntable.

The shift cylinders 41 are then operated to return the channel rails 37 to normal position, and the outgoing turntable 24a is given a quarter turn, in either a clockwise or counter-clockwise direction as may be required so as to locate the front of the automobile outward in the exit passage 28. The driver may then get into the automobile and drive it out through the exit passage 28.

Any conventional means, such as an electric eye 109—110 and target 111, may be incorporated to prevent forward or backward movement of the lift truck or raising or lowering of the lift forks while the channel rails 37 thereof are engaged with the channels in one of the bins.

Although the fluid cylinders upon the transfer and lift platform are illustrated and described as being electrically operated, it should be understood that they may be controlled by any conventional hand-operated valve by routing the fluid lines through the control panel in the cab of the lift truck.

We claim:

1. A transfer platform for vehicles comprising a supporting structure, a spaced parallel pair of channel rails mounted upon said supporting structure for receiving the wheels of a vehicle, a pair of longitudinally disposed lever arms fulcrumed upon the platform and having forked heads at their free ends, means for raising said levers to engage the forked heads thereon with the underside of the leading bumper of a vehicle for pulling the vehicle onto said channel rails, or with the underside of the trailing bumper for pulling the vehicle off of said channel rails, and means for moving said lever arms throughout the length of the platform for pulling the vehicle onto or off of said channel rails.

2. A transfer platform for vehicles comprising a supporting structure, a spaced parallel pair of channel rails mounted upon said supporting structure for receiving the wheels of a vehicle, a pair of longitudinally disposed lever arms fulcrumed upon the platform and having spaced pairs of forked heads at their free ends, means for raising either of said levers to engage the forked heads thereon with the underside of the leading bumper of a vehicle for pulling the vehicle onto said channel rails, or with the underside of the trailing bumper for pulling the vehicle off of said channel rails, and means for moving said lever arms throughout the length of the platform for pulling the vehicle onto or off of said channel rails.

3. A transfer platform for vehicles comprising a supporting structure, a spaced parallel pair of channel rails mounted upon said supporting structure for receiving the wheels of a vehicle, a pair of longitudinally disposed lever arms fulcrumed upon the platform and each having a forked head at its free end, provided with a corrugated concaved rubber contact surface, means for raising either of said levers to engage the forked head thereon with the underside of the leading bumper of a vehicle for pulling the vehicle onto said channel rails, or with the underside of the trailing bumper for pulling the vehicle off of said channel rails, and means for moving said lever arms throughout the length of the platform for pulling the vehicle onto or off of said channel rails.

4. A transfer platform for vehicles comprising a supporting structure, a spaced parallel pair of channel rails mounted upon said supporting structure for receiving the wheels of a vehicle, a pair of longitudinally disposed lever arms fulcrumed upon the platform and each having a forked head at its free end, means for raising either of said levers to engage the forked head thereon with the underside of the leading bumper of a vehicle for pulling the vehicle onto said channel rails, or with the underside of the trailing bumper for pulling the vehicle off of said channel rails, and an endless chain for moving said lever arms throughout the length of the platform for pulling the vehicle onto or off of said channel rails.

5. A transfer platform for vehicles comprising a supporting structure, a spaced parallel pair of channel rails mounted upon said supporting structure for receiving the wheels of a vehicle, a longitudinally movable table carried by the platform, a pair of longitudinally disposed lever arms fulcrumed upon the table and each having a forked head at its free end, means for raising either of said levers to engage the forked head thereon with the underside of the leading bumper of a vehicle for pulling the vehicle onto said channel rails, or with the underside of the trailing bumper for pulling the vehicle off of said channel rails, and means for moving said table throughout the length of the platform for pulling the vehicle onto or off of said channel rails.

6. A transfer platform for vehicles comprising a supporting structure, a spaced parallel pair of channel rails mounted upon said supporting structure for receiving the wheels of a vehicle, a longitudinally movable table carried by the platform, a pair of oppositely directed longitudinally disposed lever arms fulcrumed upon said table, a forked head upon the free end of each lever arm, means for raising one lever arm for engaging the forked head thereon with the underside of a bumper of a vehicle to pull the vehicle in one direction onto or off of said channel rails, means for raising the other lever arm for engaging the forked head thereon with the underside of a bumper of a vehicle to pull the vehicle in the other direction onto or off of the channel rails, and means for moving said table throughout the length of the platform.

7. In a vehicle storage structure having a spaced pair of normally stationary channel rails for receiving the wheels of a vehicle, a transfer platform having a similarly spaced pair of channel rails movable into contact with the adjacent ends of the first named channel rails, means for pushing a vehicle from the channel rails on the platform onto the first named channel rails, and stop means upon the first named channel rails operated by the movement of the channel rails on the platform into engagement with said stop means.

8. In a vehicle storage structure having a spaced pair of normally stationary channel rails for receiving the wheels of a vehicle, a transfer platform having a similarly spaced pair of channel rails movable into contact with the adjacent ends of the first named channel rails, means for pushing a vehicle from the channel rails on the platform onto the first named channel rails, and stop means comprising pivoted spring loaded stop bars upon the first named channel rails and lugs on the channel rails on the platform for operating said stop bars.

JOSEPH J. ROBINSON, JR.
HOWARD M. WASSEM.

REFERENCES CITED

The following references are of record in the file of this patent:

UNITED STATES PATENTS

| Number | Name | Date |
|---|---|---|
| 1,937,189 | Buettell et al. | Nov. 28, 1933 |
| 2,428,856 | Sinclair | Oct. 14, 1947 |